(12) United States Patent
Suresh

(10) Patent No.: US 6,789,160 B2
(45) Date of Patent: Sep. 7, 2004

(54) MULTI-THREADED RANDOM ACCESS STORAGE DEVICE QUALIFICATION TOOL

(75) Inventor: Tanjore K. Suresh, Union City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 450 days.

(21) Appl. No.: 09/824,929

(22) Filed: Apr. 3, 2001

(65) Prior Publication Data

US 2003/0037203 A1 Feb. 20, 2003

(51) Int. Cl.[7] ................................................. G06F 11/27
(52) U.S. Cl. .......................... 711/104; 710/8; 710/10; 714/30; 714/738; 714/742; 711/170
(58) Field of Search .......................... 711/104, 170–173; 710/8, 10; 714/30, 738, 742

(56) References Cited

U.S. PATENT DOCUMENTS

| | | | |
|---|---|---|---|
| 4,348,761 A | 9/1982 | Berger | 371/21 |
| 5,361,346 A | 11/1994 | Panesar et al. | 395/575 |
| 5,394,549 A * | 2/1995 | Stringfellow et al. | 709/100 |
| 5,557,740 A | 9/1996 | Johnson et al. | 395/183.14 |
| 5,615,335 A * | 3/1997 | Onffroy et al. | 714/30 |
| 5,732,033 A * | 3/1998 | Mullarkey et al. | 365/201 |
| 5,819,030 A * | 10/1998 | Chen et al. | 709/220 |
| 5,862,151 A * | 1/1999 | Fagerness | 714/733 |
| 6,006,350 A * | 12/1999 | Tsujii | 714/738 |
| 6,499,126 B1 * | 12/2002 | Tsuto | 714/738 |

OTHER PUBLICATIONS

Copy of Search Report for PCT/US 02/10514, dated Sep. 29, 2003 (1 page).

* cited by examiner

Primary Examiner—Mano Padmanabhan
Assistant Examiner—Jasmine Song
(74) Attorney, Agent, or Firm—Osha & May L.L.P.

(57) ABSTRACT

A method for qualifying random access storage devices is disclosed which includes determining qualification parameters for each of the random access storage devices, determining a configuration for each of the random access storage devices, and qualifying each of the random access storage devices based on the determined qualification parameters and configuration. A tool for qualifying random access storage devices is disclosed which includes a parser for determining qualification parameters, a machine configuration collector for determining random access storage device configuration, and a thread spawner for qualifying each of the random access storage devices based on the determined qualification parameters and configuration.

25 Claims, 15 Drawing Sheets

MULTI-THREADED RANDOM ACCESS STORAGE DEVICE QUALIFICATION TOOL

BACKGROUND OF INVENTION

Computer processors comprise arithmetic, logic, and control circuitry that interpret and execute instructions from a computer program. Referring to FIG. 1, a typical computer system includes a microprocessor (22) having, among other things, a CPU (24), a memory controller (26), and an on-chip cache memory (30). The microprocessor (22) is connected to external cache memory (32) and a main memory (34) that both hold data and program instructions to be executed by the microprocessor (22). Internally, the execution of program instructions is carried out by the CPU (24). Data needed by the CPU (24) to carry out an instruction are fetched by the memory controller (26) and loaded into internal registers (28) of the CPU (24). Upon command from the CPU (24) requiring memory data, the fast on-chip cache memory (30) is searched. If the data is not found, then the external cache memory (32) and the slow main memory (34) is searched in turn using the memory controller (26). Finding the data in the cache memory is referred to as a "hit." Not finding the data in the cache memory is referred to as a "miss."

The time between when a CPU requests data and when the data is retrieved and available for use by the CPU is termed the "latency" of the system. If requested data is found in cache memory, i.e., a data hit occurs, the requested data can be accessed at the speed of the cache and the latency of the system is reduced. If, on the other hand, the data is not found in cache, i.e., a data miss occurs, and thus the data must be retrieved from the external cache or the main memory at increased latencies.

Multi-threaded processors exist such that when functions performed by a given thread in a processor come to a halt, e.g., when awaiting data to be returned from main memory after a read operation, the processor can perform other functions on a different thread in the meantime. These processors embody the ability to instantaneously switch execution flow, for example, from a Thread A to a Thread B, when Thread A is blocked from execution. As mentioned above, most often execution is blocked by waiting for an input-output (I/O) operation (typically, a read/write operation) to complete.

Random Access Storage Devices are the most common secondary storage device and allow data to be stored in any order, i.e., randomly, and retrieved in any order. Some examples of random access storage device are hard disks, CDROM, DVD-ROM, and floppy disks. Typically, random access devices have large storage capacity and they access data very quickly. The data is stored in random access storage devices on a sector or logical block basis. The addressing of the data on the sector for retrieval is done using two mechanisms. A hard disk contains cylinders, heads, and sectors, so the data can be addressed by cylinder, head, and sector number. Alternatively, recent hard disks have mechanisms that allow logical block addressing. That is, the whole capacity of the drive is split into a stream of fixed size blocks called logical blocks and addressed using logical block numbers.

In computer systems, such random access storage devices are connected to a host bus adapter (HBA). The HBA allows communication with the storage device using well known protocols to get the data in and out of the device. The protocol used dictates the number of devices that can be connected or addressed. The connected devices are called targets.

It is possible that a target could be manufactured with multiple logical units contained within the target. These logical units within a target could represent a homogenous or heterogeneous set of devices. For example, a target could have 4 logical units and each logical unit could be a individual storage device with some capacity associated with it.

The most fundamental program resident on any computer is the operating system (OS). Various operating systems exist in the market place, including Solaris™ from Sun Microsystems Inc., Palo Alto, Calif. (Sun Microsystems), Macintosh® from Apple Computer, Inc., Cupertino, Calif., Windows® 95/98 and Windows NT®, from Microsoft Corporation, Redmond, Wash., and Linux. A Solaris™ driver allows random access storage devices to be addressed based on a device node created by the driver framework. The logical device node exported to the users is of the form:

/dev/rdsk/c?t?d?s?

Where c? indicates the letter "c" followed by a number representing the HBA's number; t? indicates the letter "t" followed by a number representing the target number; d? indicates the letter "d" followed by a number representing the logical unit number (LUN); s? indicates the letter "s" followed by the partition number within the device addressed using the controller number, target number and lun number.

Typically, the partitions are specified by the operating system under which the device is used. This information is specified in a known sector or logical block so that the driver can understand the boundaries of each partition, validate the request to read or write a sector, and export the nodes required to address the information within the partition. Also, such partitioning gives a user the flexibility to split a high capacity device into logical sections so that the data can be logically segregated. The way that the disk is partitioned is left up to the user to decide and is done using available tools for the given operating system. This partition information is called Volume Table of Contents (VTOC) under the Solaris™ operating system. The VTOC is stored in the first sector of the disk as part of the label information maintained. In Solaris™, typically slice #2 is used to address the whole device.

SUMMARY OF INVENTION

In general, in one aspect, the present invention involves a method for qualifying random access storage devices comprising determining qualification parameters for each of the random access storage devices; determining a configuration for each of the random access storage devices; and qualifying each of the random access storage devices based on the determined qualification parameters and configuration.

In general, in one aspect, the present invention involves a tool for qualifying random access storage devices comprising a parser for determining qualification parameters; a machine configuration collector for determining random access storage device configuration; and a thread spawner for qualifying each of the random access storage devices based on the determined qualification parameters and configuration In general, in one aspect, the present invention involves a tool for qualifying random access storage devices comprising means for determining qualification parameters for each of the random access storage devices; means for determining a configuration for each of the random access storage devices; and means for qualifying each of the random access storage devices based on the determined qualification parameters and configuration.

In general, in one aspect, the present invention involves a tool for qualifying random access storage devices, comprising a processor in communication with the random access storage devices; and a program executable on the processor. The program is for determining qualification parameters of each of the random access storage devices; determining a configuration for each of the random access storage devices; and qualifying each of the random access storage devices based on the determined qualification parameters and configuration.

In general, in one aspect, the present invention involves a multi-threaded tool for qualifying random access storage devices, comprising a processor in communication with the random access storage devices; and a program executable on the processor. The program comprising a command line parser for determining qualification parameters from a command line; a device discovery algorithm for determining a configuration for each of the random access storage devices; an exclude file parser for excluding random access storage devices based on the determined qualification parameters and configuration; a create/start thread algorithm for qualifying each of the random access storage devices via multiple threads based on the determined qualification parameters and configuration.

Other aspects and advantages of the invention will be apparent from the following description and the appended claims.

DETAILED DESCRIPTION

In one or more embodiments, the present invention involves a multi-threaded tool for qualifying random access storage devices. The tool is used for testing the disks' firmware and the functionality of disks and other random access storage devices. Further, the tool generates different types of traffic, such as sequential read/write and random read/write, to the device under test to qualify the robustness of the device. Also, the tool enables a user to stress the random access storage device firmware, with the least amount of configuration. Those skilled in the art will appreciate that while an exemplary embodiment is presented below with reference to the Solaris™ operating system by Sun Microsystems, Inc. of Palo Alto, Calif., the concepts presented herein are equally applicable to other operating systems.

Figure 1:
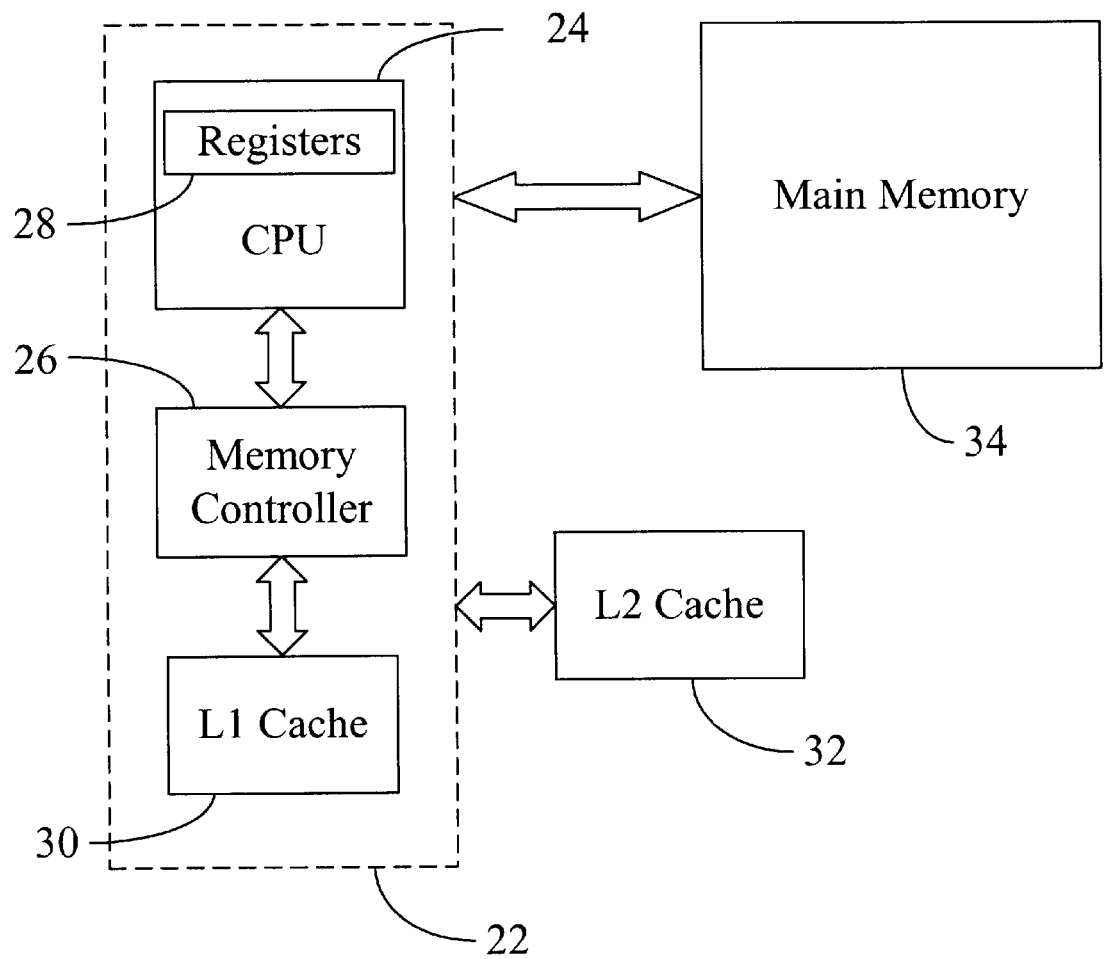
FIG. 1 shows a typical computer system.
Figure 2:
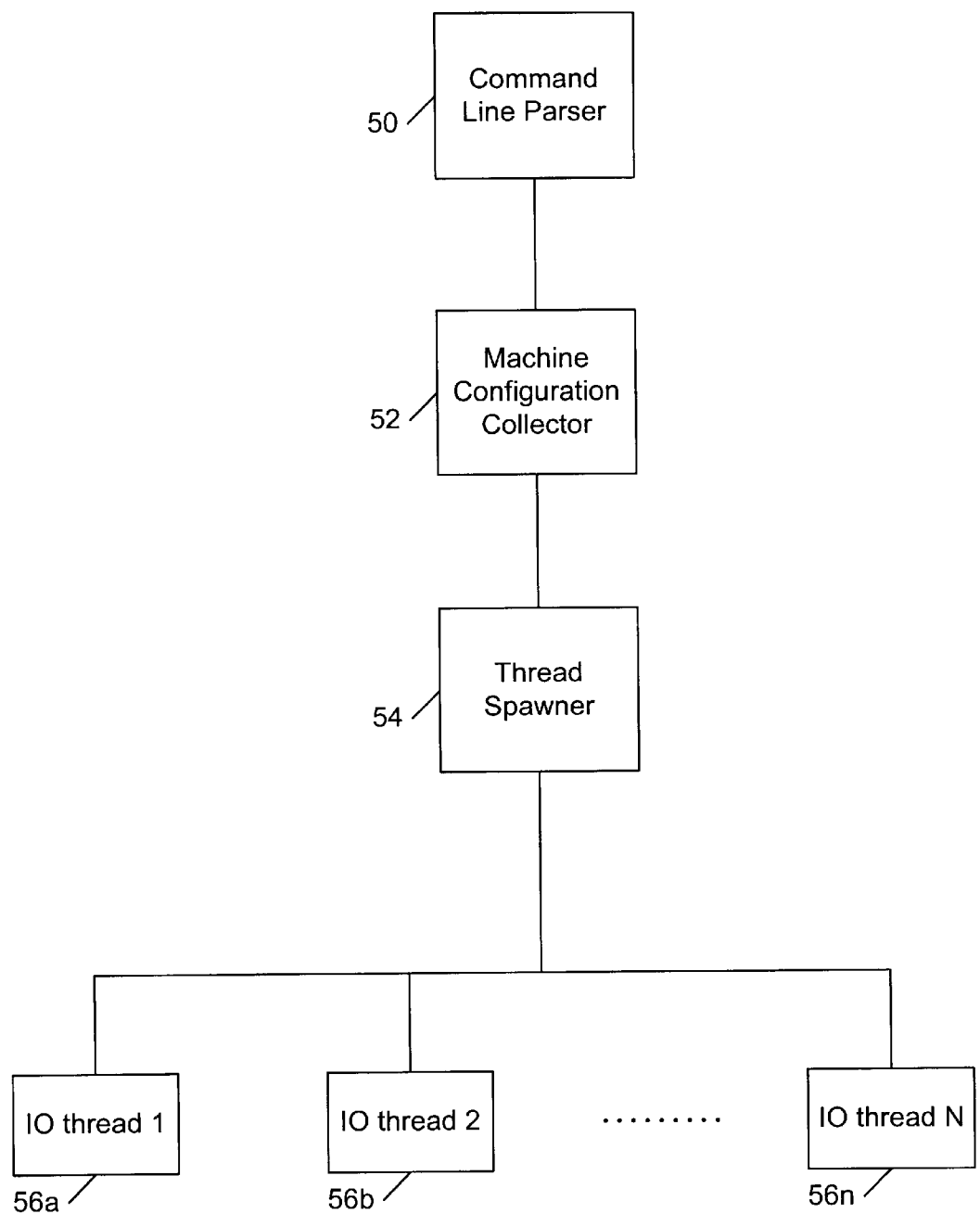
FIG. 2 is a block diagram in accordance with an embodiment of the present invention.

Referring to the drawings wherein like reference characters are used for like parts throughout the several views, FIG. 2 shows a block diagram of a system in accordance with an embodiment of the present invention. The system includes a command line parser (50), machine configuration collector (52), and a thread spawner (54). These modules are connected to IO Threads 1..n (56a–n) As used herein, IO Thread signifies Worker thread which generates the I/O activity to test the storage devices.

The tool does not require any manual configuration file settings from the user. The command line parser (50) determines qualification parameters from the executed command line. The configuration collector (52) collects the configuration information and configures the devices for starting the qualification cycle without human intervention. Particularly on servers which have thousands of devices to be identified and tests started in a short period of time, this automated configuration collection is more efficient than manual identification of devices and manual test starting. Also, the thread spawner (54) spawns a number of threads based on the request from the user and creates a stressful real life environment to validate the functionality of the devices under test. The thread spawner (54) also creates a number of sequential/random read/write threads to create the user-requested stressful environment.

Figure 3:
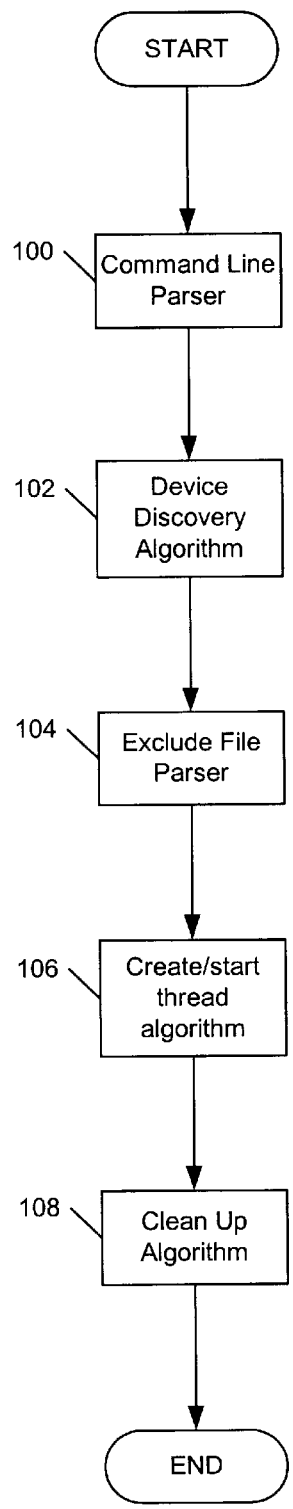
FIG. 3 is a flow chart showing a process in accordance with an embodiment of the present invention.

Referring to FIG. 3, the system executes a series of parsers and algorithms once initiated. Each parser and algorithm is discussed in more detail below. First, a command line parser (100) is run to determine which options have been set by the user. Then, a device discovery algorithm (102) is used to identify, i.e., populate device record information, each device in the device record structure. An exclude file parser (104) is next executed in order to properly exclude certain devices from the test. Then, a create/start thread algorithm (106) initiates the device testing. Lastly, a clean up algorithm (108) finalizes the testing procedure.

Figure 4:
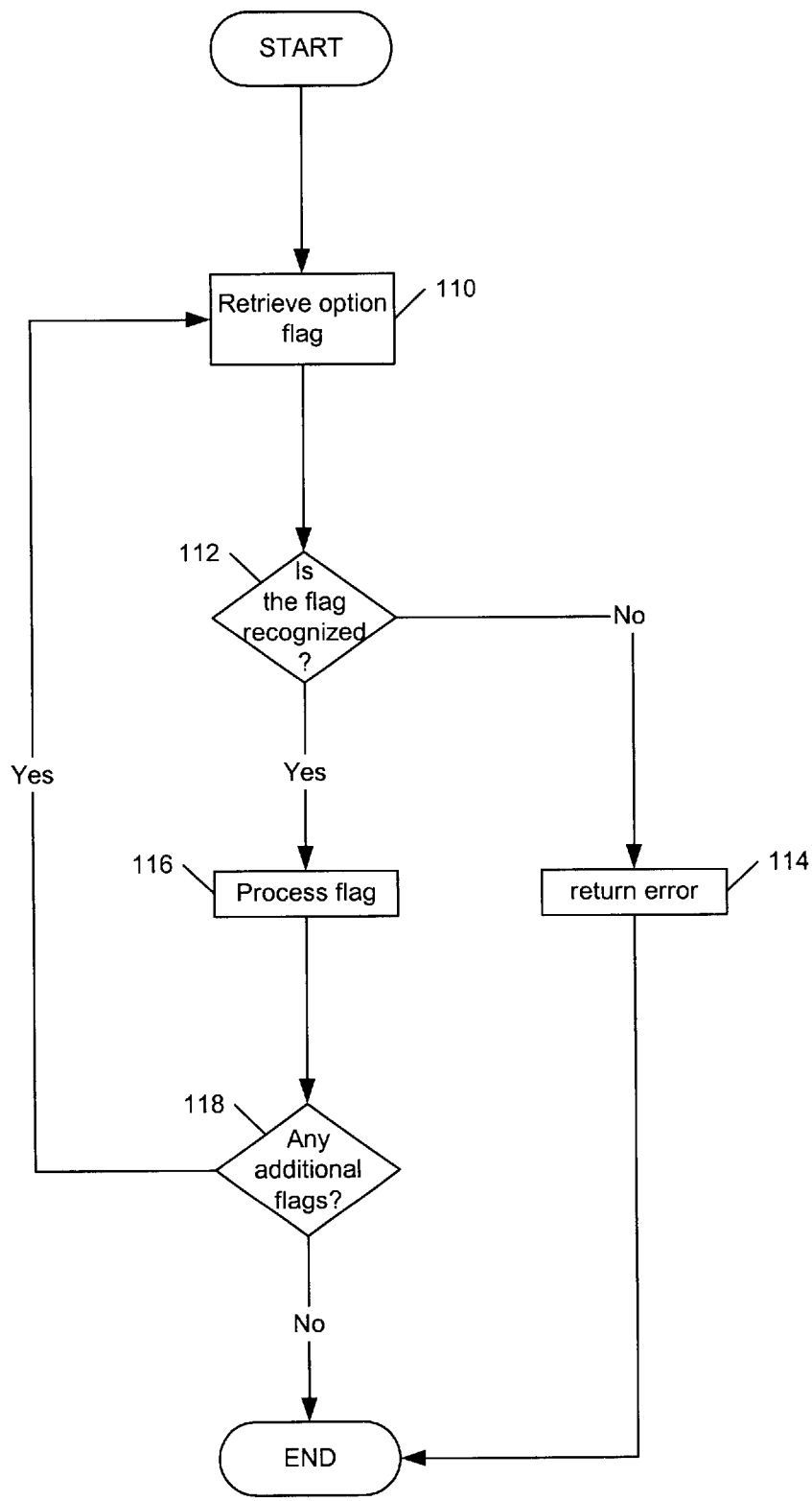
FIG. 4 is a flow chart showing an exemplary command line parser algorithm.

Command line parser (100) operates as shown in FIG. 4. First, the command line parser (100) determines which options have been specified. That is, an option flag is retrieved from the command line (step 110). Next, the command line parser determines whether the retrieved option flag is recognized (step 112). Only valid option flags are recognized by the command line parser. An exemplary manual page indicating possible options of the command line tool is included below. If an invalid option flag is retrieved, the command line parser returns an error to the user (step 114). Otherwise, the retrieved option flag is processed (step 116) and further options are retrieved if any exist (step 118). Once all flags are processed, the command line parser operation ends.

COMMAND LINE TOOL MANUAL PAGE:
NAME
mtscsirw Multi-threaded SCSI read write test.
SYNOPSIS
mtscsirw −c <controller num>[−n] [−v] [−s] [−a] [−m] [−u]
[−e <exclude file>] [−1 <logfile>] [−b <blocksize>] [−e <exclude file>] [−1 <logfile>] [−b <blocksize>] [−t <target num>] [−r <read threads>] [−w <write threads>] [−i <iterations>] [−p <num of operations>]
OPTIONS

| | |
|---|---|
| −c <controller num> | This specifies the controller number so that the threads could be dispatched to do the testing on all the identified disk targets connected to this controller. If no disk target is identified then the program exits gracefully without starting any test. This flag can not be used with −f flag (see −f) |
| −t <target num> | This specifies the target number of the device to be tested. Only one target can be specified per running process of mtscsirw if this flag is set -- otherwise all targets on a device are tested. This flag is also required for asynchronous I/O testing (see −a). This flag can not be used with −f flag (see −f) |
| −f <device> | Force the testing on device. Only raw device names (no block device) can be specified. Multiple device names can be specified with multiple −f flags (e.g., −f <dev1>−f<dev2>) −c and −t flags cannot be used with −f flag. If −c, −t, and −f flags are given together, −f flag supercedes. |
| −e <exclude file> | This specifies the file name which contains the list of targets, controllers, and luns to be excluded from running the test. The exclude file should contain one item per line following the addressing conventions of disk nodes under Solaris.<br>For example, to exclude controller 5, target 6 on controller 2 and lun 1 on target 3 on controller 0. Provide the name of a file containing the following entries, one per line.<br>c5<br>c2t6<br>c0t3d1<br>The file which contains all these entries could be passed with this option for excluding those specific target(s)/controller(s) from test. |
| −1<logfile> | This is to capture the error log and to find the status of the test running. This file can be opened up to see what types of tests are run on different targets and their thread ids along with performance figures about the transfer rate. The same output available under this file is also displayed on the screen as when the test executes. |
| −b <block size> | This sets the minimum starting blocksize (in kilobytes) for the threads. The blocksize increases by a factor of two for each thread. The default initial blocksize is 4k. |
| −r <read threads><br>−w <write threads><br>−i <iterations> | These flags limit the number of read threads, write threads, and number of iterations per thread. mtscsirw uses −i to limit the iterations per thread. By setting the number of threads of a certain type to 0, no threads of that type will be dispatched. The default is 6 read threads, 6 write threads, and 10000 iterations. |
| −p <num of blocks per iteration> | This sets the number of blocks to read/write per iteration. The default number of blocks per iteration is determined by each disk according to this formula:<br>(partitionsize*sectorsize)<br>block size (see −b) |
| −n | No comparison. When this flag is set, mtscsirw will not compare data on each read instruction to ensure it was correctly read. |
| −s | Sequential option. Allows for one thread to read data in sequential order while other threads continue in normal (non-sequential) fashion. |
| −a | Sets asynchronous I/O. Because asynchronous I/O makes a queue of read/write requests that are processed one at a time on a single disk, mtscsirw must be invoked on only one target when this flag is set. (see −t) |
| −v | Verbose mode. This allows error messages to be duplicated on screen as well as in the log file. It also prints out information once every five iterations about each thread's progress. |
| −m | Tests writing with misaligned data. All writes are performed with buffers which begin at an odd byte memory address. |
| −u | Indicates that all threads need to be run with a fixed blocksize specified by the b blocksize option. |

Thus, processing of the recognized flags (step 116) proceeds in accordance with the above. That is, upon recognition of a known flag, certain steps are taken to alert the program of a user-requested function. If the −l flag is recognized, the lflag is set to 1 and the logfilename is copied to a variable. If the −e flag is recognized, the exclude file flag is set and the exclude filename is copied. If the −c flag is recognized, the cflag is set and the controller number is retrieved. If the −t flag is recognized, the tflag is set and the target number is retrieved. If the −i flag is recognized, the iflag is set and the number of iterations is retrieved. If the −p flag is recognized, the number of I/Os per iteration is retrieved. If the −r flag is recognized, the rflag is set and the number of read threads is retrieved. If the −w flag is recognized, the wflag is set and the number of write threads is retrieved. If the −m flag is recognized, the misaligned buffer is used for testing. If the −u flag is recognized, a fixed blocksize is used for all threads. If the −f flag is recognized, the forcedevice flag is set and the system checks for duplicates. If the −a flag is recognized, the asynch IO flag is set. If the −s flag is recognized, the true sequential flag is set. If the −v flag is recognized, the verbose flag is set. If the −n flag is recognized, the nflag is set. If the −b flag is recognized, the bflag is set and the blocksize in kilobytes is retrieved.

Figure 5:
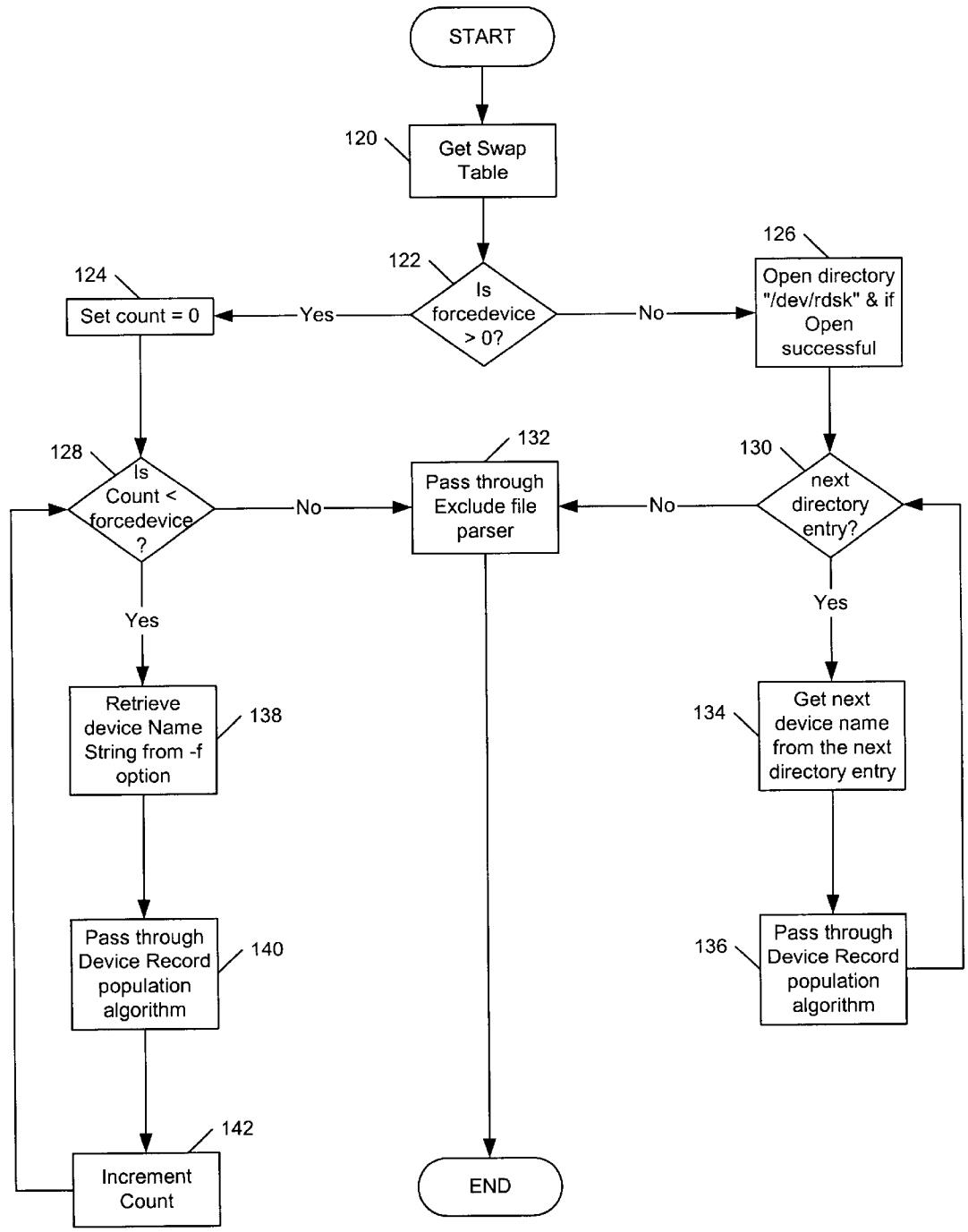
FIG. 5 is a flow chart showing an exemplary device discovery algorithm.

Referring to FIG. 5, an exemplary device discovery algorithm is shown. The process starts by retrieving the swap table (step 120). Then, the system determines whether the setting "forcedevice" is greater than zero (step 122). If so, the variable "count" is set to zero (step 124) and the system compares "count" and "forcedevice" (step 128). This comparison controls whether the system loops or passes the device through an exclude file parser (step 132). Looping consists of retrieving device name strings from the −f option (step 138), passing the device retrieved through the device record population algorithm (step 140), and incrementing the count (142). Thus, the loop continues until count is no longer less than forcedevice (step 128), at which point, the system passes the device to the exclude file parser (step 132).

If forcedevice was initially not greater than zero (step 122), the system opens the associated device directory, e.g., "/dev/rdsk", and retrieves entries from within the directory. Processing of the entries proceeds through all entries in the directory (step 130) and includes retrieving the device name from the directory entry (step 134) and passing the device through the device record population algorithm (step 136). Once all directory entries have been processed (step 130), the device is passed through an exclude file parser (step 132). The process ends upon passing the device through the exclude file parser (step 132).

Figure 6:
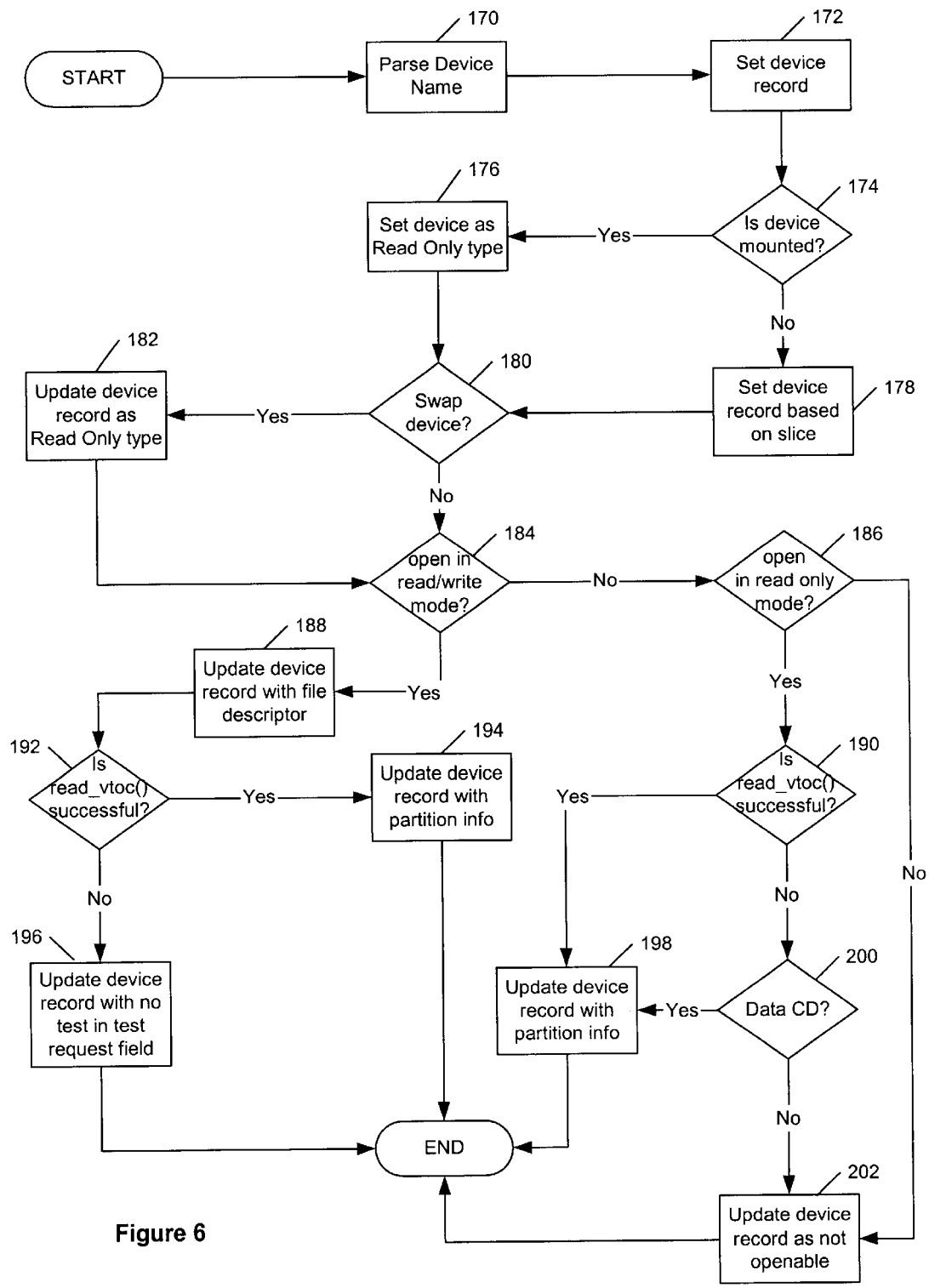
FIG. 6 is a flow chart showing an exemplary device record population algorithm.

Referring to FIG. 6, an exemplary device record population algorithm is shown. The process starts with parsing the device name (step 170) and setting the device record (step 172). The device name is parsed as /dev/rdsk/c?t?d?s? and the controller number, target number, lun number, and slice number. The device record is set with the controller number, target number, lun number, and slice number. Then, the system determines whether the device is mounted (step 174). If so, the device is set as read-only type (step 176). Otherwise, the device record is set based on slice (step 178). In the device record, the device status is set to a full disk slice if the slice number is 2. Otherwise, the device status is simply set to a slice. The system next determines whether the device is a swap device (step 180). If so, the device record is updated as read-only type (step 182) and checks if the device can be opened in read/write mode (step 184). If the device is not a swap device (step 180), the system directly proceeds to determining whether the device opened in read/write mode (step 184).

If so, the device record is updated with a file descriptor (step 188) and the function read_vtoc ( ) is executed (step 192). Also, in the device record, the status of the device is updated to openable and the device name is set (step 188). The read_vtoc function returns the volume table of contents (VTOC) structure, which carries the partition information and is stored at the first sector of a disk. If the read_vtoc ( ) function is successful, the device record is updated with partition information (step 194) and the process ends. Otherwise, the device record is updated with no test in the test request field (step 196) and the process ends.

If the device is not openable in read/write mode (step 184), the system determines whether the device can be opened in read-only mode (step 186). If not the device record is updated as not openable (step 202) and the process ends. On the other hand, if the device is openable in read-only mode, the read_vtoc ( ) function is executed (step 190). If the read_vtoc ( ) function is successful, the device record is updated with partition information (step 198) and the process ends. Otherwise, the system determines whether the device is a data CD (step 200). If so, the device record is updated with partition information (step 198) and the process ends. If not, the device record is updated as not openable (step 202) and the process ends.

Figure 7:
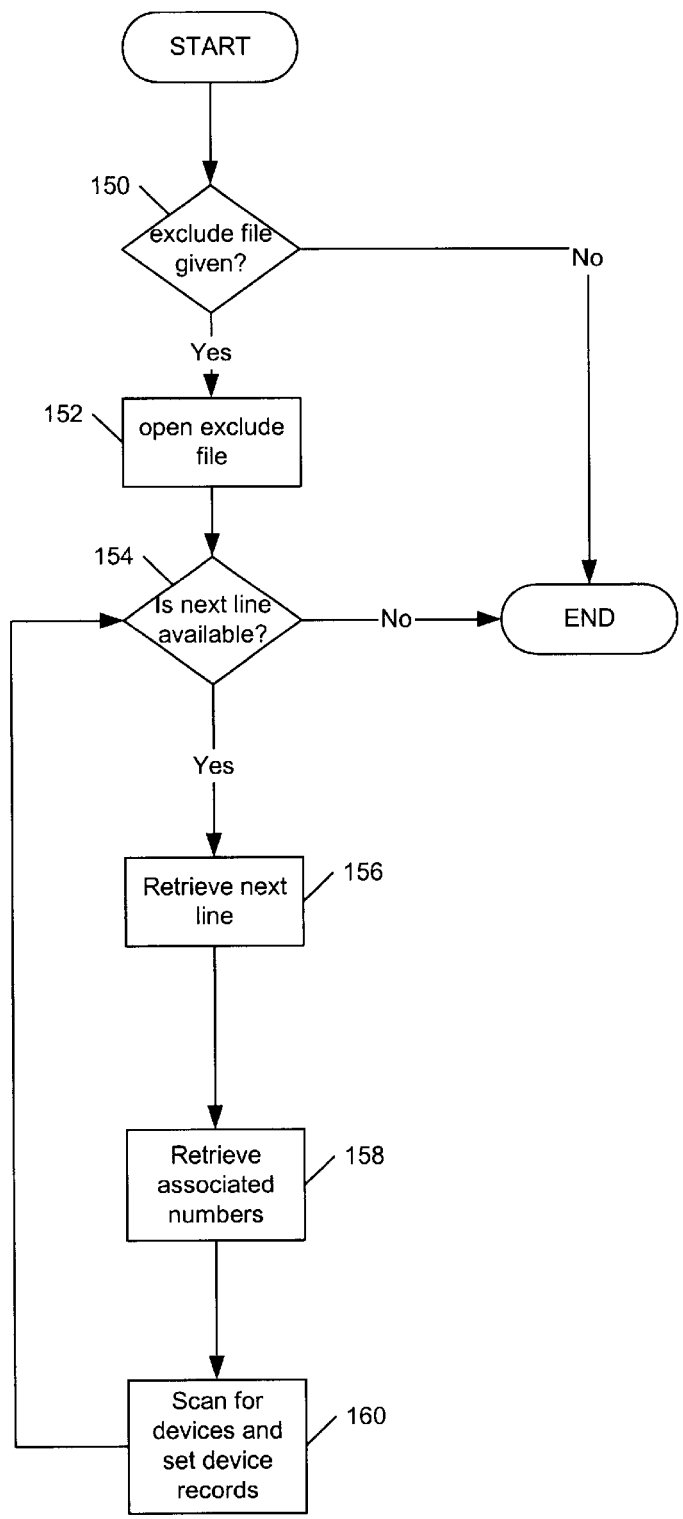
FIG. 7 is a flow chart showing an exemplary exclude file parser algorithm.

Referring to FIG. 7, an exemplary process for an exclude file parser is shown. First, the system determines whether an exclude file is given (step 150). This determination depends of the existence of the –e option. If an exclude file is not given, the process ends. Otherwise, the exclude file is opened (step 152) and the system determines if the next line is available (step 154). If a line is available, the system retrieves the line (step 156), retrieves associated numbers (158), e.g., controller number, target number, Lun number, and slice number, and scans the associated numbers for device and set device records (step 160). The system scans each device in the device record for device having the controller number; the controller number and the target number; the controller number, the target number, and the lun number; or the controller number, the target number, the lun number, and the slice number. The testreq field for the devices found are set to "do not run test." Once all available lines have been scanned, the process ends.

Figure 8:
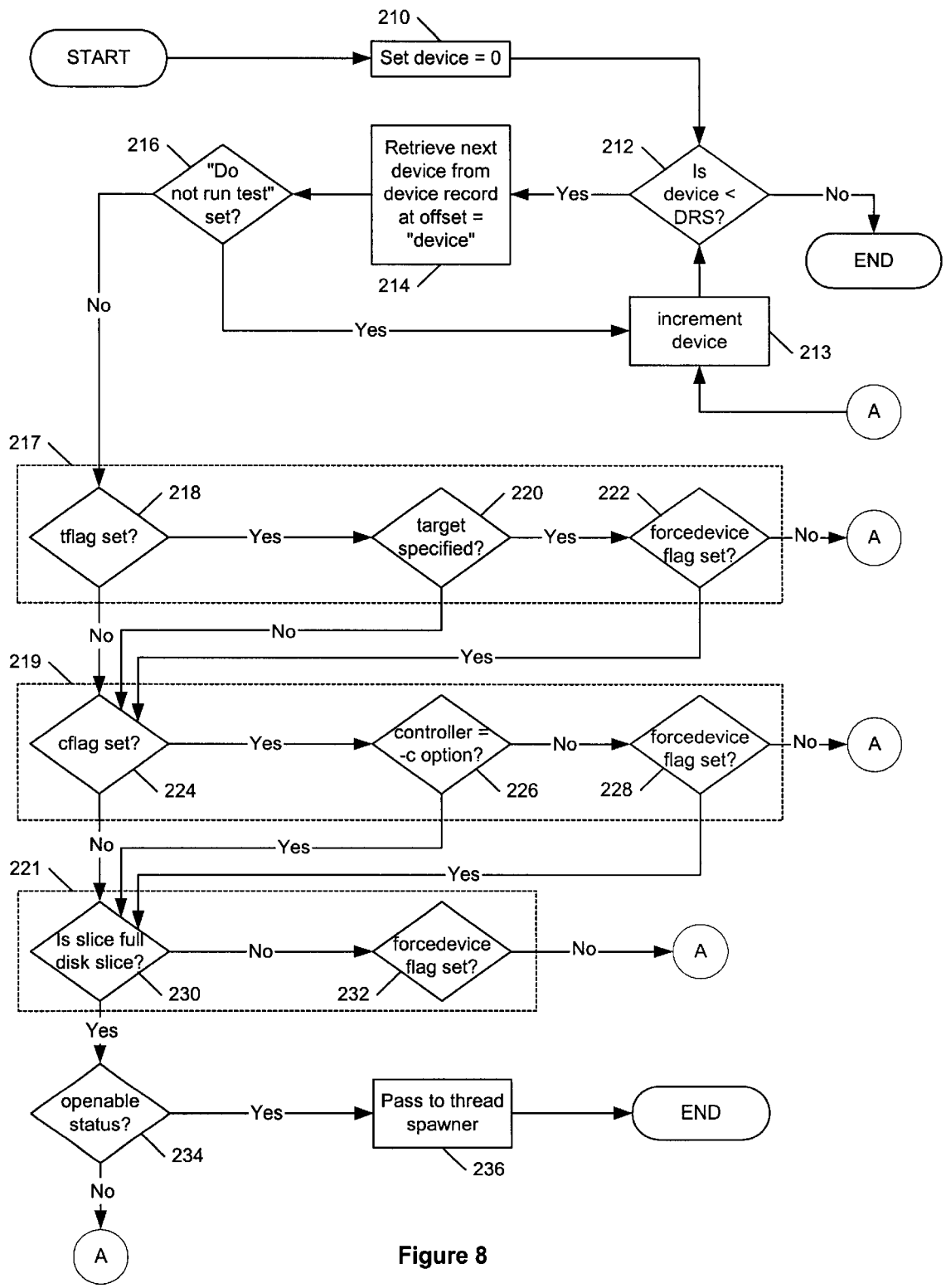
FIG. 8 is a flow chart showing an exemplary create/start thread algorithm.

Referring to FIG. 8, an exemplary create/start thread algorithm is shown. The process begins with the setting of the variable device to zero (step 210) and comparing the device number to number of devices in the device record structure (DRS) (step 212). If the device number is less than the number of devices in the record structure, the next device is retrieved from the device record at an offset equal to the device number (step 214). Otherwise, the processes ends.

After retrieving the next device from the device record at an offset equal to the device number (step 214), the system check the testreq field of the device record (step 216). If the testreq field indicates "do not run test," the device number is incremented (step 213) and the again the device number is compared to the number of devices in the DRS (step 212). If, however, the testreq field does not indicate "do not run test," then the system does a first series of checks (217). If the tflag is set (step 218), target number specified with the –t option is not equal to the target number in the device record (step 220), and the force device flag is not set (step 222), the system increments the device number (step 213) and returns to compare the device number to the number of devices in the DRS (step 212). Otherwise, the system continues with a second series of checks (219).

In the second series of checks (219), if the cflag is set (step 224), the controller number in the device record is not equal to the controller number provided with the –c option (step 226), and the forcedevice flag is not set (step 228), the system increments the device number (step 213) and returns to compare the device number to the number of devices in the DRS (step 212). Otherwise, the system continues with a third series of checks (221).

In the third series of checks (221), if the slice number is not a fall disk slice (step 230) and the forcedevice flag is not set (step 232), the system increments the device number (step 213) and returns to compare the device number to the number of devices in the DRS (step 212). Otherwise, the system determines whether the device record contains a device status for the current device indicating that the device is openable (step 234). If so, the device is passed to the thread spawner (step 236) and the process ends. Otherwise, the system increments the device number (step 213) and returns to compare the device number to the number of devices in the DRS (step 212).

Figure 9:
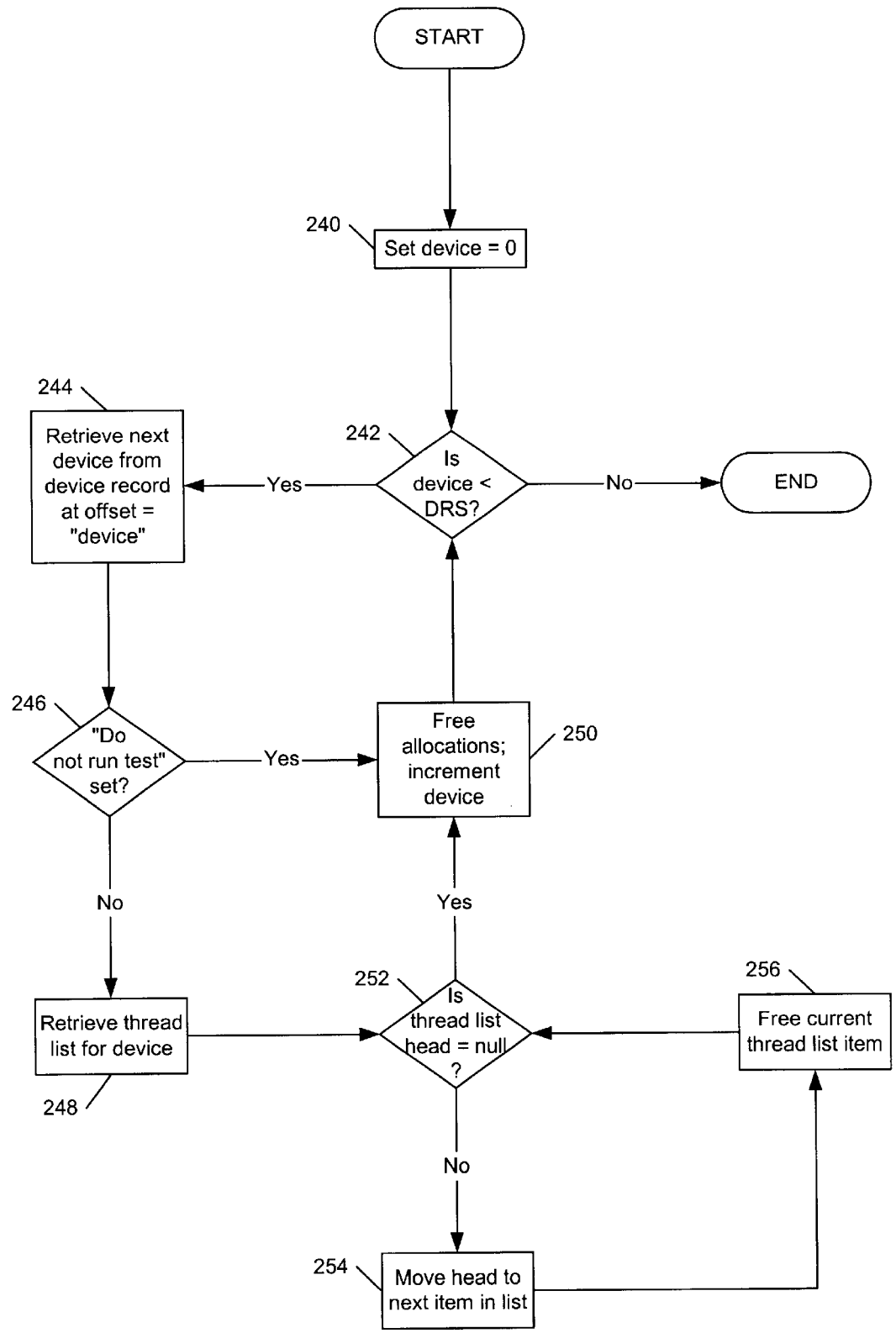
FIG. 9 is a flow chart showing an exemplary cleanup algorithm.

Referring to FIG. 9, an exemplary cleanup algorithm is shown. The process begins with the setting of the variable device to zero (step 240) and comparing the device number to number of devices in the device record structure (DRS) (step 242). If the device number is less than the number of devices in the record structure, the next device is retrieved from the device record at an offset equal to the device number (step 244). Otherwise, the process ends.

Once the next device is retrieved (step 244), the system determines if the testreq field indicates "do not run test" (step 246). If so, all of the allocations done at the time of creation of device record for the device are freed and the variable device is incremented (step 250). The process then continues with determination of whether additional devices remain (step 242).

On the other hand, if the testreq field does not indicate "do not run test" (step 246), then the thread list for the device is retrieved (step 248) and the system checks whether the head of the thread list is null (step 252). If not, the head of the list is moved to the next item in the thread list (step 254) and the current thread list item is freed (step 256). This continues until the head of the thread list is null (step 252). When the head of the thread list is null (step 252), all of the allocations done at the time of creation of device record for the device are freed and the variable device is incremented (step 250).

Figure 10:
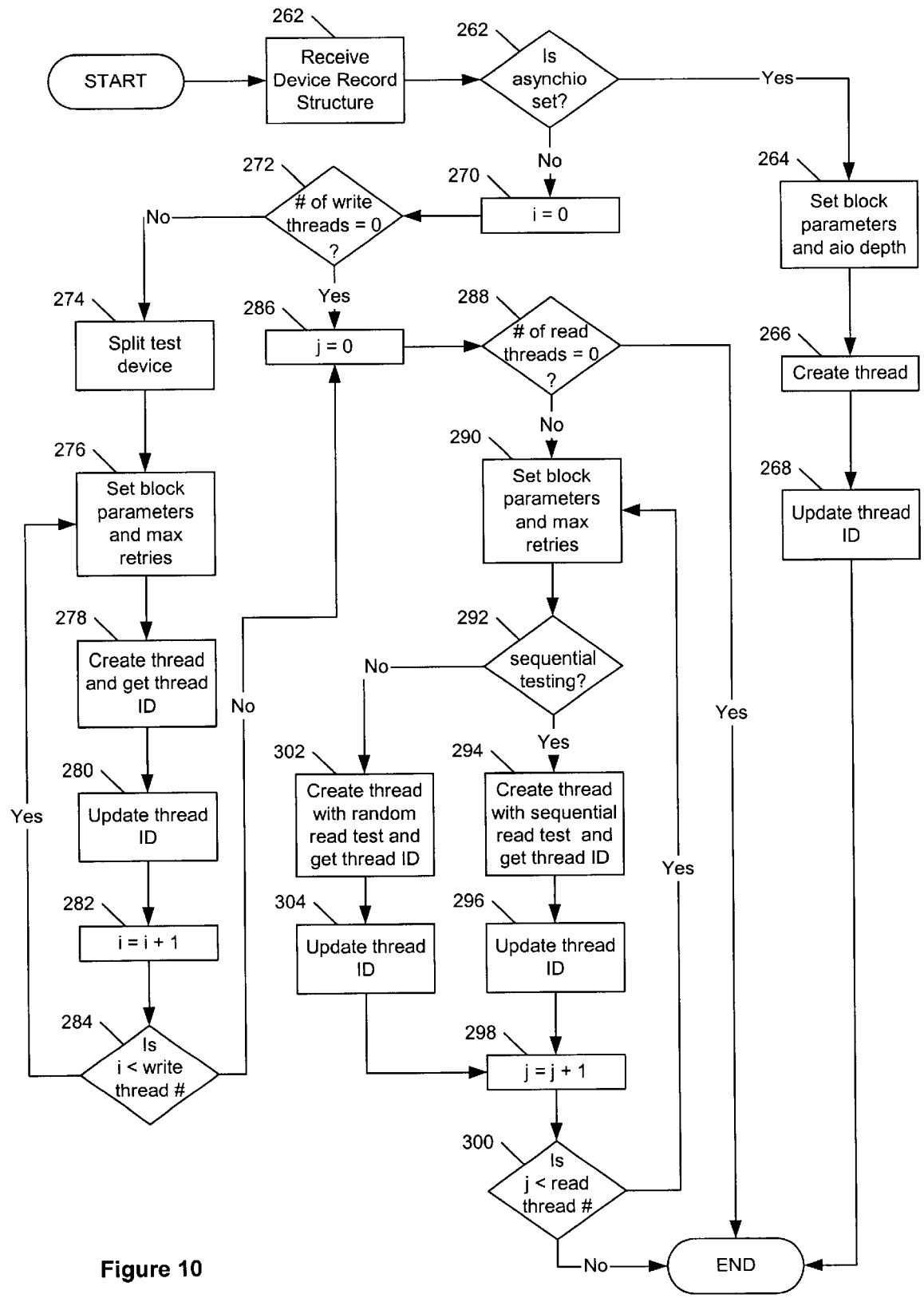
FIG. 10 is a flow chart showing an exemplary algorithm for a thread spawner.

Referring to FIG. 10, an exemplary algorithm for a thread spawner is shown. The process begins with the input of the device record structure (step 260). The system determines whether asynchio is set (step 262). If so, the blocksize is set to test, the starting block and stopping block are set, and the aio depth is set (step 264). Next, a thread is created by calling the thr_create lib, which starts the aio test, and the thread ID is returned by the thr_create call (step 266). Then, the thread ID is updated (step 268) and the process ends.

If asynchio is not set (step 262), the variable i is set to zero and the system checks whether the number of write threads is zero (step 272). If so, the system sets the variable j to zero (step 286) and checks whether the number of read threads is equal to zero (step 288). If the number of read threads and write threads are both equal to zero, the process ends.

If the number of write threads is non-zero (step 272), then the system splits the test device into non-overlapping sections (step 274). Next, the blocksize is set to test, the starting block and stopping block are set based on the non-overlapping section algorithm, and the maximum number of retries is set (step 276). Afterwards, a thread is created by calling thr_create lib and a thread id is returned by the thr_create call (step 278). The first thread will start the sequential write read test and the rest of the threads will be random write read test. The thread ID is then updated into a maintenance list indicating that the thread is running (step 280), the variable i is incremented (step 282), and the system checks whether the variable i is less than the number of write threads (step 284). If so, the process loops back to setting the block parameters and maximum number of retries (step 276). Otherwise, the process continues with the setting of the variable j to zero (step 286) and checking whether the number of read threads is equal to zero (step 288).

If the number of read threads is non-zero (step 288), the blocksize is set to test, the starting and stopping blocks are set, and the maximum number of retries is set (step 290). Then, the system determines whether sequential testing was requested (step 292). If so, a thread is created by calling the thr_create lib and a thread ID is returned by the thr_create call (step 294). The thread created will be a running sequential read test. Next, the thread ID is updated into a maintenance list indicating that the thread is running (step 296), the variable j is incremented (step 298), and the system determines whether the variable j is less than the number of read threads (step 300).

On the other hand, if sequential testing is not requested, a thread is created by calling the thr_create lib and a thread ID is returned by the thr_create call (step 302). The thread created will be a running random read test. Next, the thread ID is updated into a maintenance list indicating that the thread is running (step 304), the variable j is incremented (step 298), and the system determines whether the variable j is less than the number of read threads (step 300). When the variable j is less than the number of read threads (step 300), the process loops back to setting the block parameters and maximum number of retries (step 290). Otherwise, the process ends.

Figure 11:
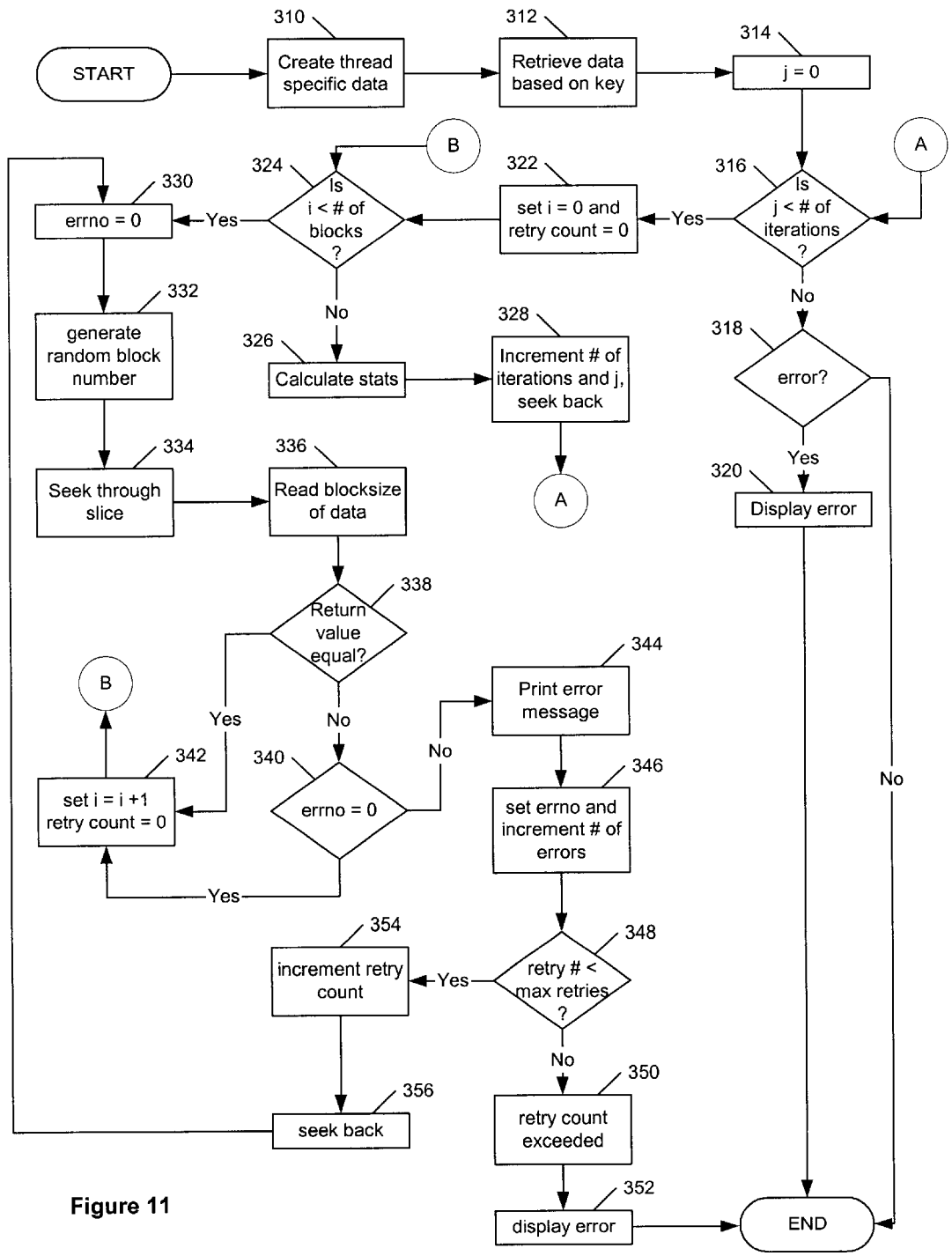
FIG. 11 is a flow chart showing an exemplary algorithm for a random read thread.

Referring to FIG. 11, an exemplary process for a random read thread algorithm is shown. The process begins with the creation of thread specific data (step 310), retrieval of thread specific data (step 312), and the setting of the variable j to zero (step 314). The system retrieves the thread specific data (step 312) based on a key using thr_getspecific lib call. Next, the system determines whether the variable j is less than the number of iterations set (step 316). If not, the system checks for errors (step 318). If there are errors (step 318), the errors are displayed in a concise format using the error number stored in the thread specific data (step 320) and the process ends. Otherwise, if j is not less than the number of iterations (step 316) and there are no errors (step 318), the process ends.

On the other hand, if j is less than the number of iterations set (step 316), the variables i and retry count are set to zero (step 322). Then, the system determines whether the variable i is less than the number of blocks to be read (step 324). If not, performance statistics are calculated based on the current iteration (step 326), the number of iterations and the variable j are incremented and the system seeks back to the beginning of the slice or device (step 328). Thereafter, the process continues with another determination of whether the variable j is less than the number of iterations (step 316).

If the variable i is less than the number of blocks (step 324), the variable errno is set to zero (step 330), a random block number is generated within the test start block and stop block (step 332). Then, the system seeks from the beginning to the appropriate random block number generated (step 334) and reads a blocksize of data using the read system call (step 336). The blocksize is set in the thread specific data. Next, the system determines whether the return value from the read is equal to the blocksize requested (step 338). If so, the variable i is incremented, the retry count is set to zero (step 342), and the process loops to re-determine whether the variable i is less than the number of blocks (step 324). If the return value is not equal to the blocksize requested (step 338), the system determines whether the variable errno is zero (step 340). If so, the variable i is incremented, the retry count is set to zero (step 342), and the process loops to re-determine whether the variable i is less than the number of blocks (step 324). Otherwise, an error message is printed (step 344), the errno is set in the thread specific data and the number of errors field is incremented (step 346), and the system determines whether the current retry count is less than the maximum number of retries (step 348).

If the maximum number of retries has not been reached by the retry count (step 348), the retry count is incremented (step 354), the system seeks back a blocksize amount from the current position on the device or slice (step 356), and the process loops to setting the errno equal to zero (step 330). On the other hand, if the maximum number of retries has been reached by the retry count (step 348), retry count exceeded is printed (step 350), an error is displayed in a concise format using the errno stored in the thread specific data (step 352), and the process ends.

Figure 12:
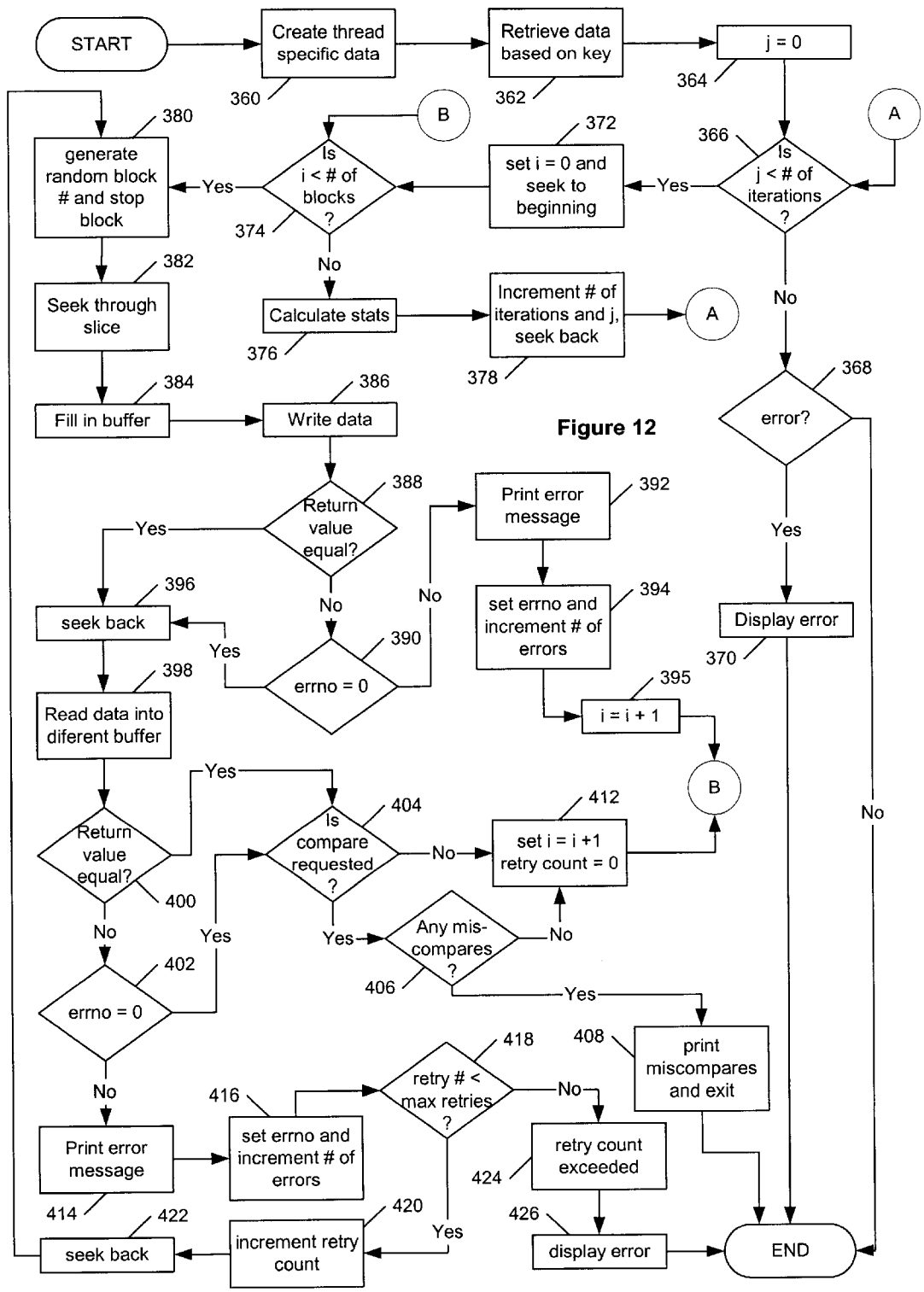
FIG. 12 is a flow chart showing an exemplary algorithm for a random read write thread.

Referring to FIG. 12, an exemplary process for a random read write thread algorithm is shown. The process begins with the creation of thread specific data (step 360), retrieval of thread specific data (step 362), and the setting of the variable j to zero (step 364). The system retrieves the thread specific data (step 362) based on a key using thr_getspecific lib call. Next, the system determines whether the variable j is less than the number of iterations set (step 366). If not, the system checks for errors (step 368). If there are errors (step 368), the errors are displayed in a concise format using the error number stored in the thread specific data (step 370) and the process ends. Otherwise, if j is not less than the number of iterations (step 366) and there are no errors (step 368), the process ends.

On the other hand, if j is less than the number of iterations set (step 366), the variables i and retry count are set to zero (step 372). Then, the system determines whether the variable i is less than the number of blocks to be read (step 374). If not, performance statistics are calculated based on the current iteration (step 376), the number of iterations and the variable j are incremented and the system seeks back to the beginning of the slice or device (step 378). Thereafter, the process continues with another determination of whether the variable j is less than the number of iterations (step 366).

If the variable i is less than the number of blocks (step 374), a random block number is generated within the test start block and stop block (step 380). Then, the system seeks from the beginning to the appropriate random block number generated (step 382), fills in the buffer with the test pattern (step 384), and writes prepared data onto the device (step 386). The blocksize is set in the thread specific data. Next, the system determines whether the return value from the write is equal to the blocksize requested (step 388). If the return value is not equal to the blocksize requested (step 388), the system determines whether the variable errno is zero (step 390). If the errno is nonzero (step 390), an error message is printed (step 392), the errno is set in the thread specific data and the number of errors field is incremented (step 394), and the variable i is incremented (step 395). The process then continues by determining whether the variable i is less than the number of blocks (step 374).

If the return value from the write is equal to the blocksize requested (step 388), the process continues by seeking back from the current position based on the blocksize for the thread (step 396). Also, if the return value from the write is not equal to the blocksize requested (step 388), but the variable errno is equal to zero (step 390), the process continues by seeking back from the current position based on the blocksize for the thread (step 396). Then, data from the device is read into a different buffer (step 398) and again the system determines whether the return value is equal to the blocksize requested (step 400). If not, the system determines whether the errno is zero (step 402). If the return value is not equal to the requested blocksize (step 400) and the errno is nonzero (step 402), then an error message is printed (step 414). Also, the errno is saved into thread specific data, the errno is then zeroed, and the number of errors is incremented (step 416). Then, the system determines whether the retry count is less than the maximum number of retries (step 418).

If the maximum number of retries has not been reached by the retry count (step 418), the retry count is incremented (step 420), the system seeks back a blocksize amount from the current position on the device or slice (step 422), and the process loops to generating a random block number (step 380). On the other hand, if the maximum number of retries has been reached by the retry count (step 418), retry count exceeded is printed (step 424), an error is displayed in a concise format using the errno stored in the thread specific data (step 426), and the process ends.

If the return value is equal to the blocksize requested (step 400), the process continues by determining whether a compare has been requested (step 404). Also, if the return value from the read is not equal to the blocksize requested (step 400), but the variable errno is equal to zero (step 402), the process continues by determining whether a compare has been requested (step 404). Then, if a comparison was not requested (step 404), the variable i is incremented, the retry count is set to zero (step 412), and the process loops to re-determine whether the variable i is less than the number of blocks (step 374). Otherwise, if a comparison was requested (step 404), a comparison of the data is performed to determine if any data mis-compares (step 406). If no mis-compares are found (step 406), the variable i is incremented, the retry count is set to zero (step 412), and the process loops to re-determine whether the variable i is less than the number of blocks (step 374). Otherwise, if mis-compares are found (step 406), the mis-compares are printed and the program is exited (step 408), which ends the process.

Figure 13:
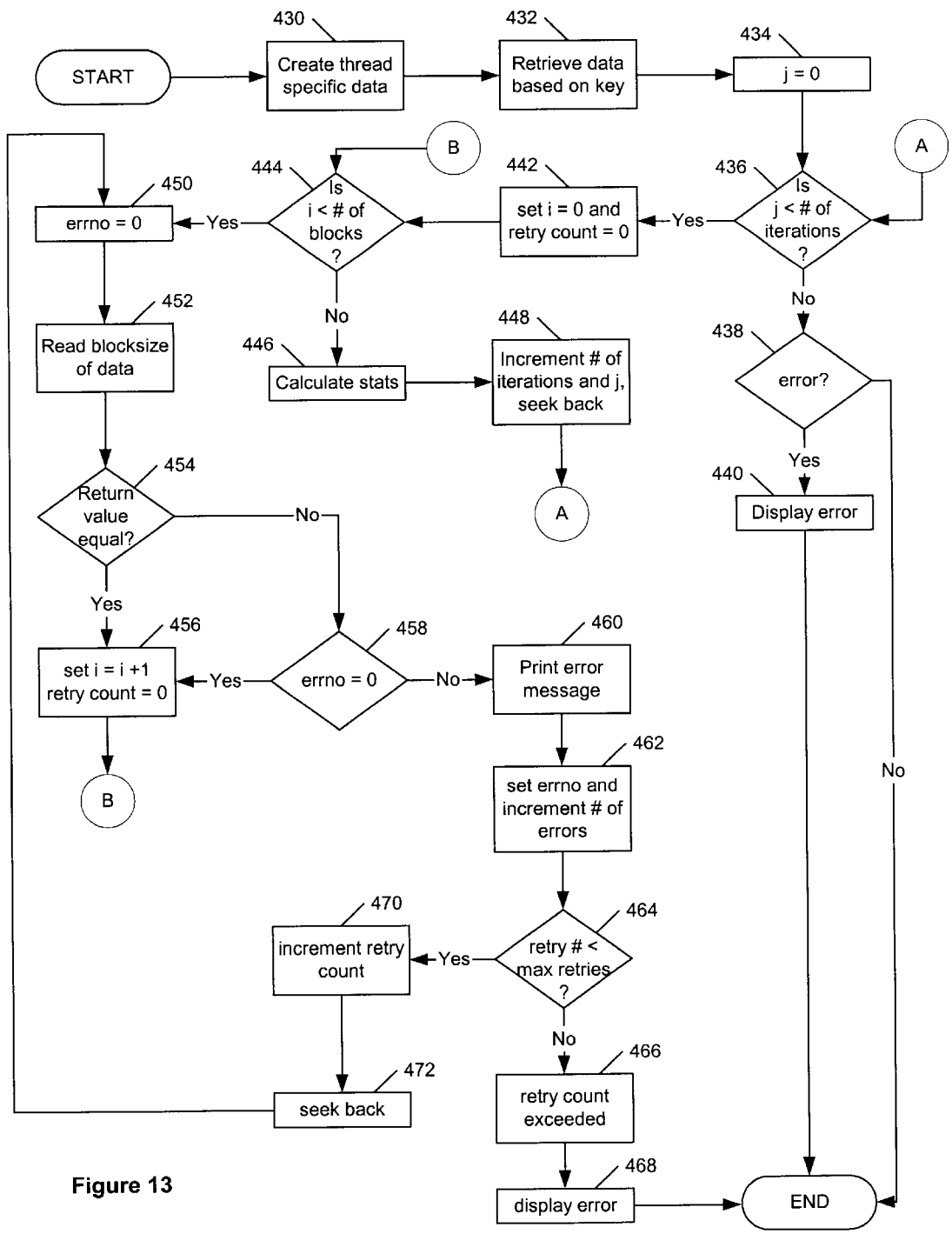
FIG. 13 is a flow chart showing an exemplary algorithm for a sequential read thread.

Referring to FIG. 13, an exemplary process for a sequential read thread algorithm is shown. The process begins with the creation of thread specific data (step 430), retrieval of thread specific data (step 432), and the setting of the variable j to zero (step 434). The system retrieves the thread specific data (step 432) based on a key using thr_getspecific lib call. Next, the system determines whether the variable j is less than the number of iterations set (step 436). If not, the system checks for errors (step 438). If there are errors (step 438), the errors are displayed in a concise format using the error number stored in the thread specific data (step 440) and the process ends. Otherwise, if j is not less than the number of iterations (step 436) and there are no errors (step 438), the process ends.

On the other hand, if j is less than the number of iterations set (step 436), the variables i and retry count are set to zero (step 442). Then, the system determines whether the variable i is less than the number of blocks to be read (step 444). If not, performance statistics are calculated based on the current iteration (step 446), the number of iterations and the variable j are incremented and the system seeks back to the beginning of the slice or device (step 448). Thereafter, the process continues with another determination of whether the variable j is less than the number of iterations (step 436).

If the variable i is less than the number of blocks (step 444), the variable errno is set to zero (step 450), and a blocksize of data is read using the read system call (step 452). The blocksize is set in the thread specific data. Next, the system determines whether the return value from the read is equal to the blocksize requested (step 454). If so, the variable i is incremented, the retry count is set to zero (step 456), and the process loops to re-determine whether the variable i is less than the number of blocks (step 444). If the return value is not equal to the blocksize requested (step 454), the system determines whether the variable errno is zero (step 458). If so, the variable i is incremented, the retry count is set to zero (step 456), and the process loops to re-determine whether the variable i is less than the number of blocks (step 444). Otherwise, an error message is printed (step 460), the errno is set in the thread specific data and the number of errors field is incremented (step 462), and the system determines whether the current retry count is less than the maximum number of retries (step 464).

If the maximum number of retries has not been reached by the retry count (step 464), the retry count is incremented (step 470), the system seeks back a blocksize amount from the current position on the device or slice (step 472), and the process loops to setting the errno equal to zero (step 450). On the other hand, if the maximum number of retries has been reached by the retry count (step 464), retry count exceeded is printed (step 466), an error is displayed in a concise format using the errno stored in the thread specific data (step 468), and the process ends.

Figure 14:
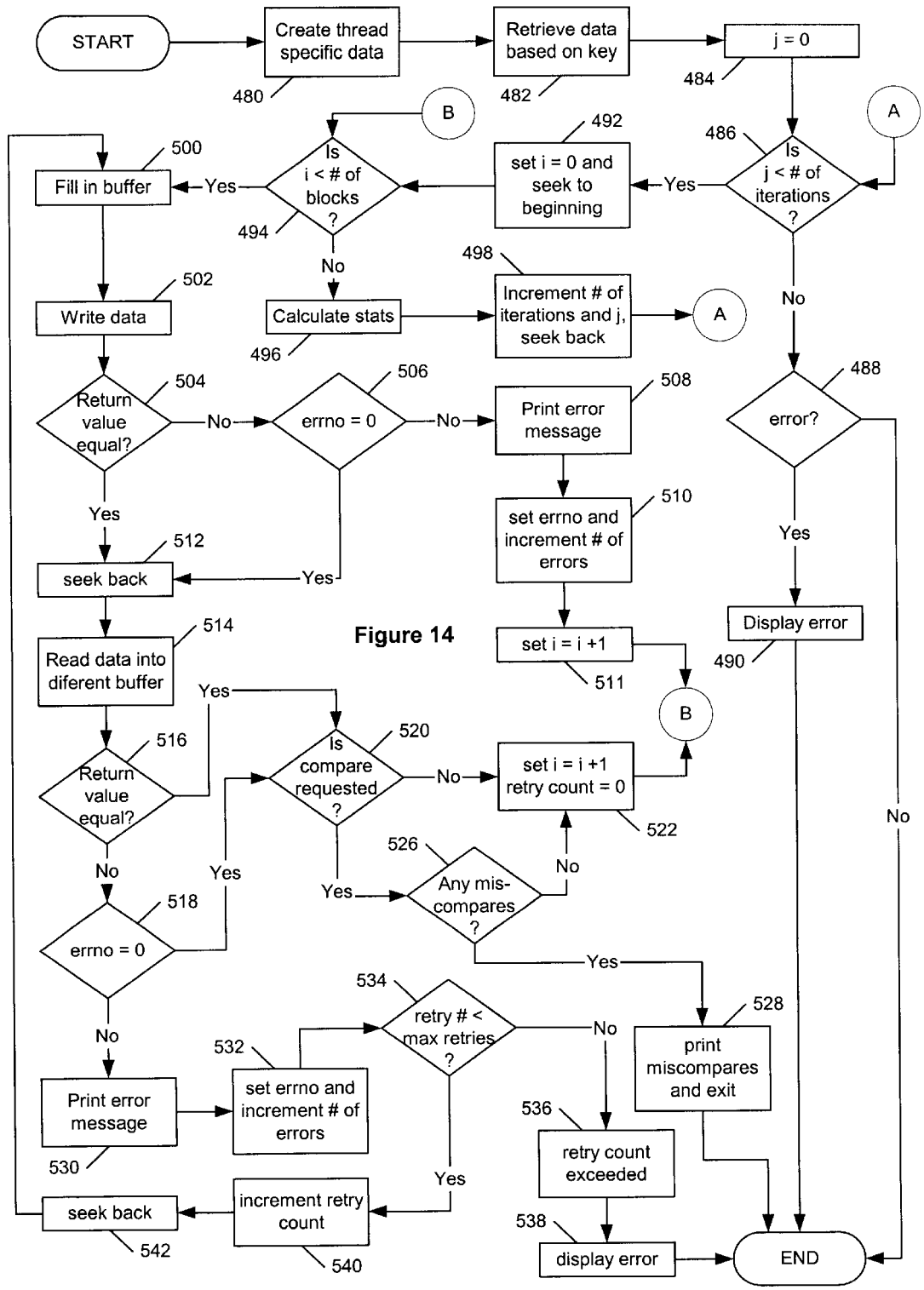
FIG. 14 is a flow chart showing an exemplary algorithm for a sequential read write thread.

Referring to FIG. 14, an exemplary process for a sequential read write thread algorithm is shown. The process begins with the creation of thread specific data (step 480), retrieval of thread specific data (step 482), and the setting of the variable j to zero (step 484). The system retrieves the thread specific data (step 482) based on a key using thr getspecific lib call. Next, the system determines whether the variable j is less than the number of iterations set (step 486). If not, the system checks for errors (step 488). If there are errors (step 488), the errors are displayed in a concise format using the error number stored in the thread specific data (step 490) and the process ends. Otherwise, if j is not less than the number of iterations (step 486) and there are no errors (step 488), the process ends.

On the other hand, if j is less than the number of iterations set (step 486), the variables i and retry count are set to zero (step 492). Then, the system determines whether the variable i is less than the number of blocks to be read (step 494). If not, performance statistics are calculated based on the current iteration (step 496), the number of iterations and the variable j are incremented and the system seeks back to the beginning of the slice or device (step 498). Thereafter, the process continues with another determination of whether the variable j is less than the number of iterations (step 486).

If the variable i is less than the number of blocks (step 494), the system fills in a buffer with a test pattern (step 500) and writes prepared data onto the device (step 502). Next, the system determines whether the return value from the write is equal to the blocksize requested (step 504). If the return value is not equal to the blocksize requested (step 504), the system determines whether the variable errno is zero (step 506). If the errno is nonzero (step 506), an error message is printed (step 508), the errno is set in the thread specific data and the number of errors field is incremented (step 510), and the variable i is incremented (step 511). The process then continues by determining whether the variable i is less than the number of blocks (step 494).

If the return value from the write is equal to the blocksize requested (step 504), the process continues by seeking back from the current position based on the blocksize for the thread (step 512). Also, if the return value from the write is not equal to the blocksize requested (step 504), but the variable errno is equal to zero (step 506), the process continues by seeking back from the current position based on the blocksize for the thread (step 512). Then, data from the device is read into a different buffer (step 514) and again the system determines whether the return value is equal to the blocksize requested (step 516). If not, the system determines whether the errno is zero (step 518). If the return value is not equal to the requested blocksize (step 516) and the errno is nonzero (step 518), then an error message is printed (step 530). Also, the errno is saved into thread specific data, the errno is then zeroed, and the number of errors is incremented (step 532). Then, the system determines whether the retry count is less than the maximum number of retries (step 534).

If the maximum number of retries has not been reached by the retry count (step 534), the retry count is incremented (step 540), the system seeks back a blocksize amount from the current position on the device or slice (step 542), and the process loops to filling in the buffer with the test pattern (step 500). On the other hand, if the maximum number of retries has been reached by the retry count (step 534), retry count exceeded is printed (step 536), an error is displayed in a concise format using the errno stored in the thread specific data (step 538), and the process ends.

If the return value is equal to the blocksize requested (step 516), the process continues by determining whether a compare has been requested (step 520). Also, if the return value from the read is not equal to the blocksize requested (step 516), but the variable errno is equal to zero (step 518), the process continues by determining whether a compare has been requested (step 520). Then, if a comparison was not requested (step 520), the variable i is incremented, the retry count is set to zero (step 522), and the process loops to re-determine whether the variable i is less than the number of blocks (step 494). Otherwise, if a comparison was requested (step 520), a comparison of the data is performed to determine if any data mis-compares (step 524). If no mis-compares are found (step 524), the variable i is incremented, the retry count is set to zero (step 522), and the process loops to re-determine whether the variable i is less than the number of blocks (step 494). Otherwise, if mis-compares are found (step 524), the mis-compares are printed and the program is exited (step 526), which ends the process.

Figure 15:
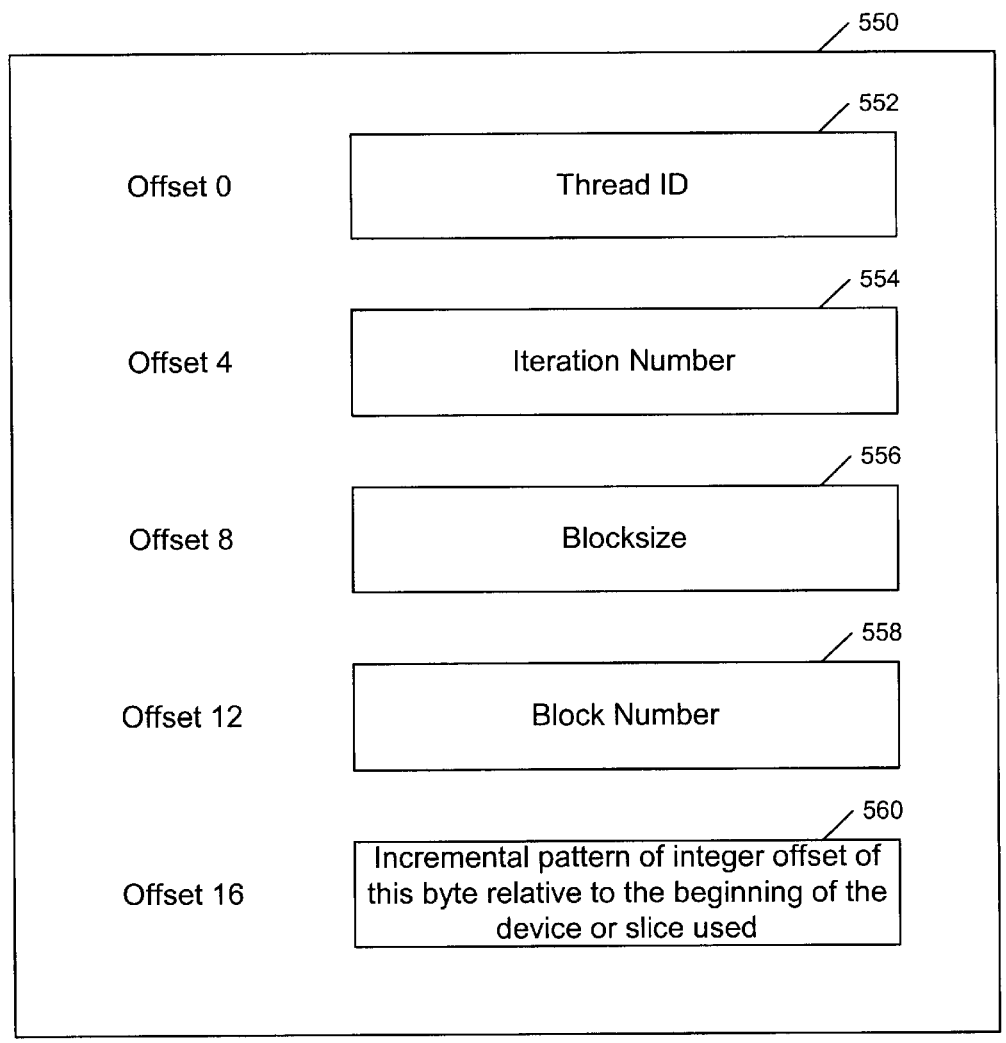
FIG. 15 is an exemplary data pattern generated by the system.

Referring to FIG. 15, an exemplary data pattern generated by the system (550) is shown. Blocksize varies from thread to thread. The first few offsets and the pattern generated within a block is shown in block form. As can be seen, the data pattern (550) includes four bytes of thread id at offset 0 (552), four bytes of iteration number at an offset of 4 (554), and, at an offset of 8, the blocksize (556) that is used for writing the data. Following that, the block number (558) of the block appears at an offset of 16 and the incremental pattern of integer offset of this byte relative to the beginning of the device or slice used (560) appears at an offset of 16.

Advantages of the present invention may include one or more of the following. In one or more embodiments, the disclosed system tests various disk targets connected on different host bus adapters for functionality under heavy fixed load. Also, the system tests the overlap processing of I/O on various targets under fixed heavy load. The overlapping of I/O is achieved by designing the test programs with multiple threads. The system requires absolutely zero setup time to start tests on hardware which could potentially have thousands of disk drives. The multi-threaded nature of the qualification tool creates real life traffic to the disks to validate the disk and its operation at nominal and stressful scenarios.

The tool provides a mechanism for generating different pattern of traffic, so that units under test receive good exposure to different types of stress. The block size parameter helps to fine tune/qualify different I/O sequences. Different I/O sequences could be generated based on which applications are being executed. These I/O sequences are supported under Solaris™, this test can be used as a simulation tool for generating required traffic pattern without executing the actual application under Solaris™.

The system returns easy to read diagnostic messages which help troubleshooting of the test units. The well organized data pattern written on the test units, helps with troubleshooting tough data corruption issues more quickly. In one or more embodiments, more swap space is allocated to the program to increase performance, as there are 18 threads started for each target identified. Those skilled in the art will appreciate that the smaller the machine configuration the lesser the swap space requirements. Also, those skilled in the art will appreciate how to modify the allocation of swap space.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for qualifying random access storage devices comprising:
   determining qualification parameters for each of the random access storage devices;

automatically determining a configuration for each of the random access storage devices;

automatically configuring each of the random access storage devices for qualifying; and qualifying each of the random access storage devices based on the determined qualification parameters and configuration, wherein the qualifying is dependent on multiple threads generated for each of the random access storage devices.

2. The method of claim 1 wherein the determination of qualification parameters comprises:

parsing a command line for recognized option flags.

3. The method of claim 1 wherein the determination of the configuration for each of the random access storage devices comprises:

executing a device discovery algorithm.

4. The method of claim 1 wherein the qualifying of each of the random access storage devices comprises:

generating test patterns based on the qualification parameters; and running the generated test patterns on each of the random access storage devices.

5. The method of claim 4 wherein the generated test patterns are run on each of the random access storage devices via multiple threads.

6. The method of claim 1, further comprising:

excluding random access storage devices from qualification based on the determined configuration.

7. The method of claim 1, further comprising:

excluding random access storage devices from qualification based on the determined qualification parameters and configuration.

8. The method of claim 1 wherein the qualification of the random access storage devices comprises:

reading data from random access storage devices based on configuration; and writing data to random access storage devices based on configuration.

9. The method of claim 8, further comprising:

reading data one of sequentially and randomly based on the determined qualification parameters.

10. The method of claim 8, further comprising:

writing data one of sequentially and randomly based on the determined qualification parameters.

11. A tool for qualifying random access storage devices comprising:

a parser for determining qualification parameters;

a machine configuration collector for automatically determining random access storage device configurations and automatically configuring each of the random access storage devices for qualifying; and a thread spawner for qualifying each of the random access storage devices based on the determined qualification parameters and configuration, wherein the thread spawner is configured to selectively generate multiple threads for each of the random access storage devices.

12. The tool of claim 11 wherein the parser comprises:

a command line parser for recognizing option flags in a command line.

13. The tool of claim 11 wherein the machine configuration collector uses a device discovery algorithm to determine the configuration of the random access storage devices.

14. The tool of claim 11, further comprising:

a test pattern generator for generating test patterns based on the determined qualification parameters; and wherein qualification of the random access storage devices comprises running the generated test patterns on each of the random access storage devices.

15. The tool of claim 14 wherein the generated test patterns are run on each of the random access storage devices via multiple threads created by the thread spawner.

16. The tool of claim 11 further comprising:

an exclude file parser for excluding random access storage devices from qualification based on the determined configuration.

17. The tool of claim 11, further comprising:

an exclude file parser for excluding random access storage devices from qualification based on the determined qualification parameters and configuration.

18. The tool of claim 14 wherein the test pattern generator comprises:

a data reading means for reading data from each of the random access storage devices; and a data writing means for writing data to each of the random access storage devices.

19. A tool for qualifying random access storage devices comprises:

means for determining qualification parameters for each of the random access storage devices;

means for automatically determining a configuration for each of the random access storage devices;

means for automatically configuring each of the random access storage devices for qualifying; and means for qualifying each of the random access storage devices based on the determined qualification parameters and configuration, wherein the means for qualifying is dependent on multiple threads generated for each of the random access storage devices.

20. The tool of claim 19, further comprising:

means for excluding random access storage devices from qualification.

21. The tool of claim 14, the test pattern generator comprising:

means for reading data sequentially and randomly from the random access storage devices.

22. The tool of claim 14, the test pattern generator comprising:

means for writing data sequentially and randomly from the random access storage devices.

23. A tool for qualifying random access storage devices, comprising:

a processor in communication with the random access storage devices; and a program executable on the processor, the program for determining qualification parameters of each of the random access storage devices;

automatically determining a configuration for each of the random access storage devices;

automatically configuring each of the random access storage devices for qualifying; and qualifying each of the random access storage devices based on the determined qualification parameters and configuration, wherein the qualifying is dependent on multiple threads generated for each of the random access storage devices.

24. A multi-threaded tool for qualifying random access storage devices, comprising:

a processor in communication with the random access storage devices; and a program executable on the processor, the program comprising a command line parser for determining qualification parameters from a command line;

a device discovery algorithm for automatically determining a configuration for each of the random access storage devices and automatically configuring each of the random access storage devices for qualifying;

an exclude file parser for excluding random access storage devices based on the determined qualification parameters and configuration; and a create/start thread algorithm for qualifying each of the random access storage devices based on the determined qualification parameters and configuration, wherein the create/start thread algorithm generates multiple threads for each of the random access storage devices.

25. The multi-threaded tool of claim 24, comprising:

a program executable on the processor, the program comprising
 a clean up algorithm.

* * * * *